(12) United States Patent
Unger (10) Patent No.: US 8,212,946 B2
(45) Date of Patent: Jul. 3, 2012

(54) MECHANICAL ARRANGEMENT FOR FLAT PANEL TV

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 902 days.

(21) Appl. No.: 12/218,896

(22) Filed: Jul. 17, 2008

(65) Prior Publication Data

US 2010/0013742 A1    Jan. 21, 2010

(51) Int. Cl.
*H04N 5/64* (2006.01)
(52) U.S. Cl. .......................................... 348/836
(58) Field of Classification Search ............ 348/836
See application file for complete search history.

(56) References Cited

U.S. PATENT DOCUMENTS

| | | | | |
|---|---|---|---|---|
| 4,554,615 A * | 11/1985 | Clark | ............................. | 361/637 |
| 6,494,429 B2 * | 12/2002 | Tajima | ............................. | 248/473 |
| 6,511,282 B2 * | 1/2003 | Notohardjono et al. | ...... | 414/800 |
| 6,642,453 B2 * | 11/2003 | Shotey et al. | ................... | 174/66 |
| 7,316,379 B1 * | 1/2008 | Graham | ...................... | 248/298.1 |
| 7,397,461 B1 * | 7/2008 | Graham | ......................... | 345/156 |
| 7,679,578 B2 * | 3/2010 | Schedivy | ............................. | 345/7 |
| 7,694,634 B2 * | 4/2010 | Wiebe et al. | .................. | 108/152 |
| 2001/0043290 A1 * | 11/2001 | Yamamoto | ..................... | 348/836 |
| 2007/0124765 A1 * | 5/2007 | Bennett et al. | ................... | 725/38 |
| 2009/0109352 A1 * | 4/2009 | Lewis et al. | .................... | 348/837 |

FOREIGN PATENT DOCUMENTS
WO    WO 2007/095750 A1    8/2007

OTHER PUBLICATIONS

"Mounting Flat Panels and Rear Projection TV's", Vantage Point, date unknown.
LCD TV HV-LIPS Power Supply; ON Semiconductor; date unknown.
Define Flush, Dictionary.com; printed Mar. 2, 2012.
Definition of Flush, Webster's II New College Dictionary; Published by Houghton Mifflin Company, 1995.

* cited by examiner

*Primary Examiner* — David Czekaj
*Assistant Examiner* — Leron Beck
(74) *Attorney, Agent, or Firm* — Miller Patent Services; Jerry A. Miller (57) ABSTRACT

A television device has a display panel having a video display situated therein, the display panel being housed in a substantially rectangular housing. A support electronics housing separate from the display panel, is sized to be no wider than a standard household wall stud spacing and no deeper than a standard household wall cavity depth. The support electronics housing carries electronics that support use of the display panel as a television. One or more electrical cables electrically interconnects the support electronics housing with the display panel. An electronic video interface resides in the support electronics housing and having an electrical connector to provide video signals thereto. A power source resides in the support electronics housing that receives household electrical power and supplies electrical power to the display panel through the one or more electrical cables. A mounting bracket assembly mounts the display panel to a wall such that the rear surface is approximately flush with the wall. The support electronics can be situated remotely from the display panel to permit flush mounting of the display panel to the wall, and may be inserted into a wall cavity between wall studs. This abstract is not to be considered limiting, since other embodiments may deviate from the features described in this abstract.

25 Claims, 4 Drawing Sheets

MECHANICAL ARRANGEMENT FOR FLAT PANEL TV

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

One of the more popular features of modern large flat televisions (TVs), such as those based upon liquid crystal display (LCD) panels is that they can be wall mounted. Data from various sources shows that at this writing around 15% of flat TV owners opt for wall mounting. However, many more people purchase flat televisions with the intention of wall mounting until they realize how difficult and expensive it can be. Conventionally, the support electronics that protrude from the rear of the panel present a problem in that they add non-aesthetic thickness to the television product and connecting source devices creates cable clutter which is often readily visible and unsightly. There is also the problem of providing power to the wall mounted set. This is depicted in profile in FIG. 1 wherein the conventional arrangement of a flat TV 10 is depicted. In this arrangement, the TV 10 is provided with approximately the form factor profile shown wherein display panel and backlight (if any) assembly 14 (or simply "display panel") is affixed to an enclosure that carries the various support electronics for the television including, for example, receiver, remote control circuitry, processor, power supply, and various audio and video interfaces (e.g., various analog and digital audio and video interfaces including RF, component video, stereo audio, and HDMI interfaces). In order to mount the television to a wall 22, some sort of bracket is normally affixed to either the panel, shown as bracket 26, or alternatively a bracket is affixed to the enclosure 18 carrying the support electronics, shown as bracket 30. In either case, the brackets 26 are normally bolted or screwed to the drywall or drywall and studs of a conventional household wall 22 using screws, bolts or other fasteners 34. Many arrangements are possible for making this connection to the wall, and thus the depiction shown is intended to be merely illustrative of the concept. In certain embodiments a bracket panel bolts to the wall and then accepts the television 10 using any number of mechanical fastening techniques. Further complicating the wall mounting problem, is the need to provide household power connections and audio-video (A/V) connections shown as wires 38 and 42 to the TV 10. This further contributes to the aesthetics problem with current flat TV designs.

Figures 1, 2:
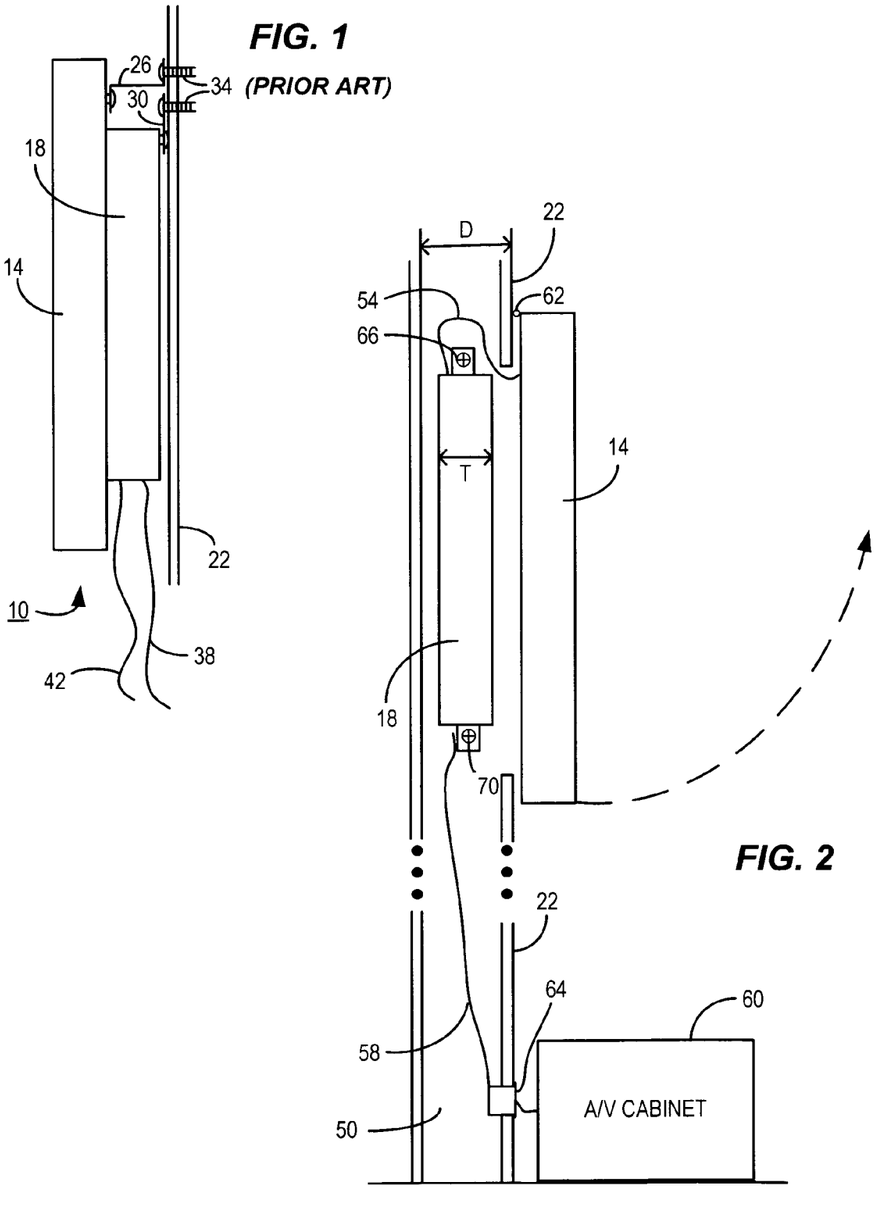
FIG. 1 is a side view of a conventional flat television device mounted to a wall.
FIG. 2 is an example implementation of a flat television device consistent with certain embodiments of the present invention.

However, regardless of the mounting mechanism, the support electronics 18 that protrude from the rear of the panel 14 add non-aesthetic thickness to the television product and connecting source devices creates cable clutter which is often readily visible and unsightly. Many efforts are underway to make TVs thinner via mechanical adjustments and changes in component heights. Similarly there are efforts to make the panel remote from some of the electronics and provide the content wirelessly. Even so, an electrician is frequently required to provide a power drop behind the installation.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "housing" and "enclosure" are used interchangeably and synonymously herein.

In accord with certain embodiments consistent with the present invention a television device has its components partitioned such that the bulk of support electronics can be placed in a wall cavity behind the TV display panel or otherwise hidden to permit the television display panel to readily mount flush to a wall. In this context the term "flush" should be interpreted to mean approximately in surface to surface contact, however, a small spacing or a spacing approximately defined by a bumper or bracket is permissibly within the meaning of the term, but is in any event smaller than the thickness of the support electronics housing.

In accord with certain implementations, the support electronics for a television device are packaged such that they will fit within a conventionally sized wall cavity behind the display panel. Most homes are constructed using studs that are covered with drywall to form the wall surface (generally about ½ inch thick). Placing the electronics in the wall cavity takes advantage of the nominal 3.5 inches of space plus the drywall thickness (or paneling or other wall surface material thickness) of one wall that is present in most walls (thus generally permitting a maximum thickness of less than 4 inches, but preferably less). By appropriately sizing the support electronics housing, only the actual display surface needs to project beyond the wall and the panel itself can hide the support electronics enclosure.

Since the wall cavity is opened for the television installation, cables can be run at the same time from the electronics housing 18 to an opening near floor level. The flashing of the electronics enclosure can be used to cover the raw drywall edge and eliminate any complex drywall work.

Turning now to FIG. 2, a first embodiment consistent with the certain implementations is depicted in a side cutaway view. In this example implementation, the television device 10 is partitioned into two separable segments. The first segment includes display panel 14 that has the video display panel such as an LCD panel and associated backlighting circuitry (if required by the display panel technology) situated therein. The display panel 14 is housed in a substantially rectangular housing having a viewing surface facing the right as shown and a rear surface facing the left as shown in this illustration with the viewing surface and the rear surface being separated by an approximately uniform depth. The support electronics housing 18 is detachably connectable to the rear surface of the panel 14 and is sized to be no wider than a standard household wall stud spacing and no deeper in depth T than a conventional wall cavity 50 depth D when one wall surface is partially removed behind the location designated for mounting the display panel 14. The support electronics housing 18 carries electronics that support use of the display panel as a television such as for example, receiver, tuner, remote control circuitry, television, processor digital decoder, power supply, and various audio and video interfaces (e.g., various analog and digital audio and video interfaces including RF, component video, stereo audio, and HDMI interfaces). For purposes of this document, the terms "power supply" and "power source" are used to synonymously mean a device that converts one form of electrical energy to another, such as from alternating current to direct current, and/or converts electrical energy at one voltage to another voltage. One or more electrical cables 54 electrically interconnect the support electronics housing 18 with the display panel 14. An electronic video interface resides in the support electronics housing 18 and has an electrical connector to provide video signals thereto via one or more wiring cables 58 that can be passed through cavity 50 from behind the display panel 14 to an connection panel 64 through which the television video signals can be passed. Similarly, a power source residing in the support electronics housing 18 supplies electrical power to the display panel through the one or more electrical cables (also shown as 54), with the power source being connected to power through another cable also represented as 58. Cable 58 is used to represent one or a plurality of cables, at least one of which supplies video signals to the display electronics housing 18. The source of A/V signals may be any suitable source including devices stored in an A/V cabinet 60 which is generally located nearby and may provide a convenient way to hide cabling through a connection panel or other 64 or other type of access point. In certain embodiments, the connection panel 64 provides any number of inputs to the television device or other connections to the support electronics housing 18 and the circuitry therein so that various A/V interconnections can be readily made as will be described in greater detail later.

A mounting bracket assembly shown schematically as a hinge-like mounting arrangement 62 allows for mounting the display panel to the wall such that the rear surface is approximately flush with the wall. The spacing between wall 22 and panel 14 is shown in an exaggerated form, but can be essentially flush. In some embodiments, a bumper or the like can be provided at the bottom of the panel to permit the bottom of panel 14 to gently come to rest against the wall 22.

In this manner, the support electronics in housing 18 can be either detached from the display panel to permit flush mounting of the display panel to the wall, or the support electronics can be inserted into a wall cavity behind the display panel and between wall studs. In this example, the support electronics can be mounted to a wall stud using brackets and screws 66 and 70. In any event, the wiring is hidden from view and can terminate behind furniture such as a home entertainment cabinet 74 or the like. In the implementation shown, the panel 14 can be rotated on the hinge-like mount of any suitable design as shown by the dashed arrow to permit access to the support electronics housing 18 for service, interconnection of other devices, etc. The wiring is hidden inside the wall as is the support electronics housing 18 and the display panel is substantially flush with the wall 22 without protruding outward making for a more aesthetically pleasing and compact mounting system.

Figure 3:
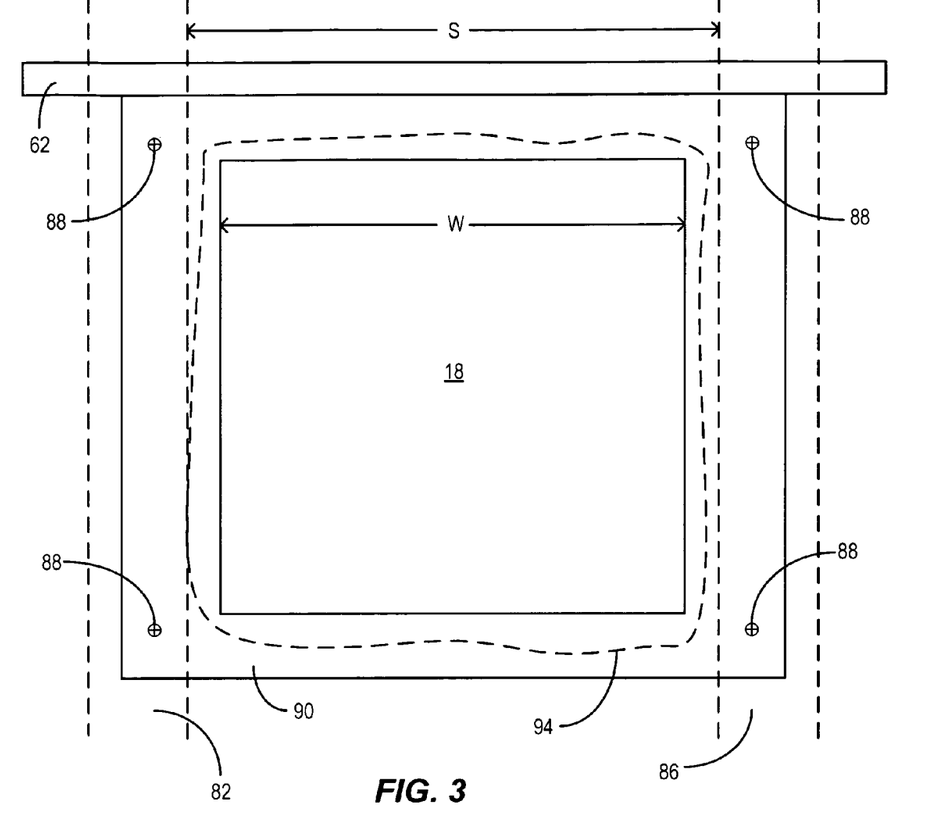
FIG. 3 is a front view of an example support electronics housing mounted within a wall cavity using a peripheral flange implemented in a manner consistent with certain embodiments of the present invention.

FIG. 3 depicts another embodiment consistent with certain implementations wherein the support electronics is housed in a housing whose depth is less than D and width W is less than a standard household stud spacing S between studs 82 and 86 (typically about 14.5 inches) and preferably around 12 inches to allow for variations. In this implementation, the support electronics housing is provided with a flange 90 on at least part of its most outward facing surface, such flange being either provided as an integral part of the housing 18 or provided as one or more separable flanges that can be used or not depending upon the user's particular desired mounting scenario. The flange 90 is not considered to be a part of the electronics housing 18 per se for clarity of definition of the size parameters disclosed herein, but as noted, may or may not be fabricated as a unitary part of the electronics housing 18 without limitation. This flange can be sized to permit attachment by screws 88 or other suitable attachment to studs 82 and 86—thus extending the horizontal width from left to right of the flanged portion to greater than the space between wall studs. Hence, in certain embodiments the width is such that connection to the wall studs is facilitated to permit a very secure attachment of the electronics housing and the television display panel 14 to wall studs. In another embodiment, the flange may incorporate a clamping mechanism so that the drywall itself provides all mechanical support for the electronics housing 18.

A passageway can be provided to permit wiring to pass above and/or below the flange with easy access to connectors on the exposed surface of enclosure 18 to permit connection to HDMI connectors, electrical power connection to the display panel, etc. (not shown). When such a flange 90 is provided, it can be made wide enough so that it covers the cut edge 94 of the drywall (or other wall surface) to hide imperfections in the cuts and permit a professional looking finish without need for a particularly clean cut in the drywall and professional drywall finishing skills so that an ordinary homeowner can generally carry out the installation safely. In addition, in certain embodiments, the hinging mechanism or support bracket 62 (or a part thereof) may be provided at the upper edge of the flange 90 so as to further facilitate ease of mounting the display panel 14 by simply slipping the display panel into place once the support electronics housing 18 is securely mounted inside the wall cavity. In other embodiments, a separate mounting bracket can be used to mount the display panel 14. However, in either case, by virtue of opening up the wall cavity, location of wall studs is simplified thus assuring a secure mounting of the display panel 14.

Figure 4:
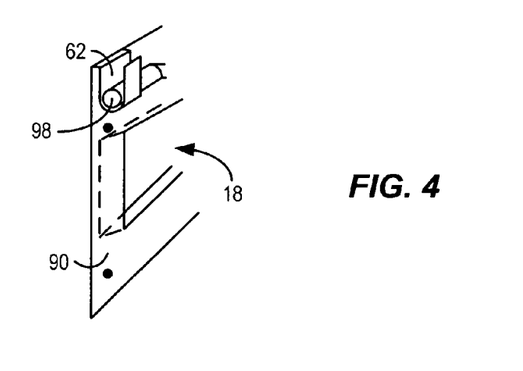
FIG. 4 is another view of the support housing depicting one embodiment of a hinge-like display panel mount integral therewith consistent with certain embodiments of the present invention.

FIG. 4 depicts one example mounting bracket assembly in which the flange 90 of the outward surface of housing 18 is in part formed into a U-shaped bracket or other mechanical configuration such as an O-shaped bracket that receives a hinge pin 98 which is attached to the rear surface of the display panel 14 (display panel and connection thereto not shown for clarity). This example is but one possibility for mounting of the display panel using a hinge pin and bracket or other assembly that receives the hinge pin. In such an arrangement, a hinge pin keeper of any suitable design (e.g., similar to that used in a carbiner or other design can be provided to attach to the hinge pin or bracket to prevent the hinge pin from accidentally coming out of engagement with the bracket. Many other variations will occur to those skilled in the art including, but not limited to, keyhole shaped apertures in the mounting brackets that accept flared pins connected to the rear of the display panel (and the opposite, where the keyhole is in the television display panel 14 and the pins are in the mounting bracket and other systems that will occur to those skilled in the art upon consideration of the present teachings.

Figure 5:
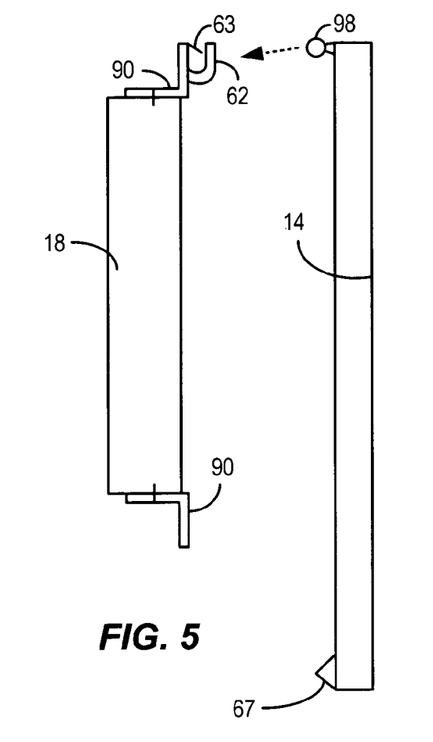
FIG. 5 is a side cutaway view of an example implementation of a support electronics housing with separate attached flanges to permit attachment of the housing to a wall cavity in a manner consistent with certain embodiments of the present invention.

FIG. 5 depicts an arrangement in cutaway of the housing 18 with flanges 90 at the top and bottom which are removably attached to the housing 18, with the top flange incorporating a bracket 62 for receiving hinge pins 98 attached to the display panel 14. A bumper 67 is shown having approximately the thickness of the hinge pin and bracket to permit the panel 14 to come gently to rest against the wall 22 (not shown in this illustration). FIG. 5 is shown in cutaway so that the mounting of flange 90 at the top and bottom are clearly depicted, but it will be understood that the flange or flanges may also be attached to each side of the housing 18 in order to provide covering for drywall cuts as described previously. Variations on the hanging bracket would permit the panel to be angled out and/or down from the wall.

Figure 6:
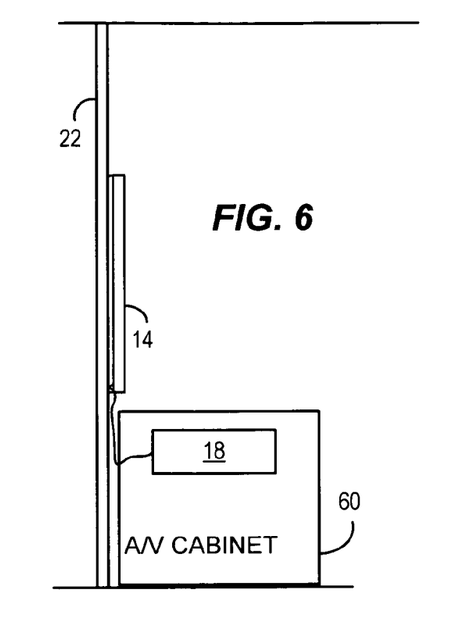
FIG. 6 is an example implementation of the separate mounting of the display panel and the support housing consistent with certain embodiments of the present invention.

If the user does not wish to cut open the wall behind a proposed mounting location, partitioning the support electronics 18 separately from the display panel 14 permit further versatility in mounting. In FIG. 6, the display panel 14 is mounted directly to wall 22 in any suitable manner, but since the display panel's support electronics are separate or separable, the support electronics can be placed or mounted inside an A/V cabinet 60 or other suitable piece of furniture as shown. Wiring can then be dropped behind the furniture or placed inside the wall as desired. In this manner, the panel can be attached to the wall or to the cabinet (much like a mirror on a dresser) with the electronics inside the cabinet. In a slight variation, the display panel can be placed on a stand on the A/V cabinet without requiring the depth needed when the support electronics are attached.

Figure 7:
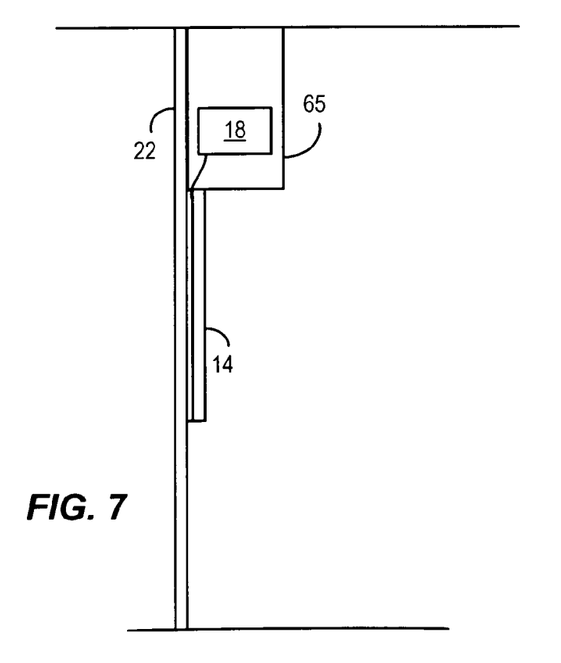
FIG. 7 is another example implementation of the separate mounting of the display panel and the support housing consistent with certain embodiments of the present invention.

Another variation is shown in FIG. 7 in which a kitchen or other installation is provided with the support electronics housing 18 hidden in an upper cabinet 65 with the display panel 14 either hanging from the cabinet 65 or attached to the wall directly below the cabinet 65.

Figure 8:
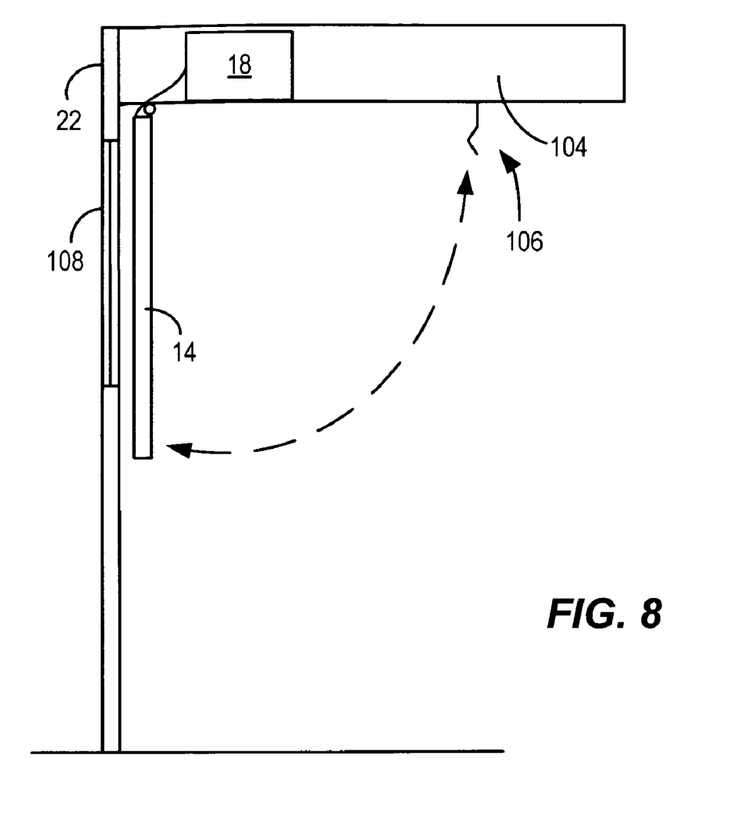
FIG. 8 is an example implementation of the separate mounting of the display panel and the support housing consistent with certain embodiments of the present invention.

Yet another variation is depicted in FIG. 8 in which a hinged ceiling mount is provided. A ceiling mount permits, in certain cases, the implementation of a large flat panel in rooms that have insufficient available wall space. Here the panel could swing down from a storage position flat against the ceiling 104 where it is held in place by a suitable latch mechanism depicted at 106 and can even cover a window 108, a bookcase, etc. when the room's usage mode is changed to TV viewing by swinging the display panel downward for viewing. Here the electronics enclosure could be mounted in the cavity 104 between the ceiling joists (not shown) using any suitable technique including those previously described. The back side of the panel could be painted to match the normal ceiling and make it less obtrusive.

Figure 9:
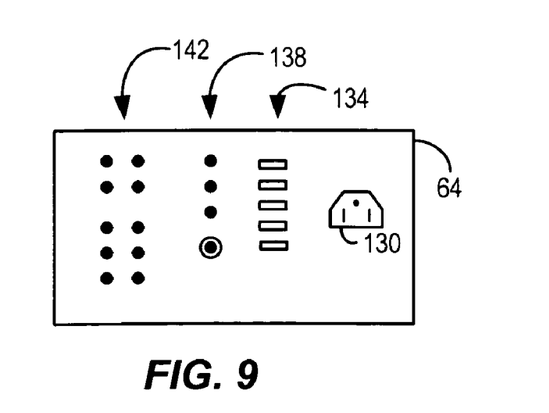
FIG. 9 depicts an example implementation of an access panel in a front view as seen by the user in a manner consistent with certain embodiments of the present invention.

As mentioned previously, any number of wiring configurations can be utilized in a manner consistent with embodiments of the present invention in order to interconnect various home A/V equipment to the television device. FIG. 1 depicted a connection panel 64 through which the various interconnections can be made. FIG. 9 shows an illustrative embodiment of such a connection panel 64 which is intended to be illustrative, but not limiting. In this example, essentially the connections that one would expect to find on the back and/or front panel of a television set or hidden behind a door on such a television set are brought down to the connection panel 64 for access, e.g., behind an A/V cabinet or other location that permits unsightly wiring to be kept out of view. In this example, power is provided to the television set using a conventional three prong connector 130. In this illustration, a plurality of digital connections such as HDMI connectors 134 can be provided along with S-Video connectors RF connectors and other connectors 138, as well as conventional analog audio and video connections 142 on the connection panel. Of course, this connection panel 64 is only intended to be illustrative and any type of connections can be provided.

Thus, a television device consistent with certain embodiments has a display panel having a video display situated therein, the display panel being housed in a substantially rectangular housing having a viewing surface and a rear surface separated by an approximately uniform depth. A support electronics housing is separate from the display panel and is sized to be no wider than a standard household wall stud spacing and no deeper than a standard household wall cavity depth. The support electronics housing carries electronics that support use of the display panel as a television. One or more electrical cables electrically interconnect the support electronics housing with the display panel. An electronic video interface resides in the support electronics housing and has an electrical connector to provide video signals thereto. A power source resides in the support electronics housing that receives household electrical power and supplies electrical power to the display panel through the one or more electrical cables. A mounting bracket assembly is provided for mounting the display panel to a wall such that the rear surface is approximately flush with the wall. The support electronics can be situated remotely from the display panel to permit flush mounting of the display panel to the wall, and may be inserted into a wall cavity between wall studs.

In certain embodiments, the television device has a flange situated at an outer periphery of the support electronics housing to facilitate mounting of the support electronics housing within a hole in a wall so that the support electronics is substantially recessed within a wall cavity. In certain embodiments, the flange surrounds a periphery of the support electronics housing and is sized so as to hide a cut edge of the wall and overlaps adjacent wall studs to permit attachment of the flange to the wall studs to mechanically support the support electronics housing within the wall cavity. In certain embodiments, the flange is integral to a portion of the support electronics housing. In certain embodiments, the flange is detachable from the support electronics housing. In certain embodiments, the flange includes a clamping mechanism that mechanically clamps the support electronics housing to a segment of drywall. In certain embodiments, the mounting bracket assembly is connected to the flange. In certain embodiments, the mounting bracket assembly comprises a hinged mounting bracket assembly situated adjacent an upper edge of the display panel to permit the display panel to rotate upward and downward about the hinge. In certain embodiments, a hinge pin keeper prevents the hinge pin from inadvertently disengaging from the mounting bracket assembly. In certain embodiments, the mounting bracket assembly comprises a hinged mounting bracket assembly situated adjacent an upper edge of the display panel to permit the display panel to rotate upward and downward about the hinge. In certain embodiments, a hinge pin keeper that prevents the hinge pin from inadvertently disengaging from the mounting bracket assembly. In certain embodiments, the support electronics housing is less than 14.5 inches wide and less than 4.0 inches deep and less than a height of the display panel. In certain embodiments, the support electronics housing is mechanically detachably connectable to the display panel. In certain embodiments, the television device also has a connection panel separate from the support electronics housing that comprises a plurality of electrical connectors that facilitate connection of audio video devices thereto.

In another example, a television device has a display panel having a video display situated therein, the display panel being housed in a substantially rectangular housing having a viewing surface and a rear surface separated by an approximately uniform depth. A support electronics housing is separate from the display panel and is sized to be no wider than a standard household wall stud spacing and no deeper than a standard household wall cavity depth. A flange is situated at an outer periphery of the support electronics housing to facilitate mounting of the support electronics housing within a hole in a wall so that the support electronics is substantially recessed within a wall cavity, wherein the flange surrounds a periphery of the support electronics housing and is sized so as to hide a cut edge of the wall and overlaps adjacent wall studs to permit attachment of the flange to the wall studs to mechanically support the support electronics housing within the wall cavity. The support electronics housing carries electronics that support use of the display panel as a television. One or more electrical cables electrically interconnect the support electronics housing with the display panel. An electronic video interface resides in the support electronics housing and having an electrical connector to provide video signals thereto. A power source resides in the support electronics housing that receives household electrical power and supplies electrical power to the display panel through the one or more electrical cables. A mounting bracket assembly is connected to the flange for mounting the display panel to a wall such that the rear surface is approximately flush with the wall. The support electronics can be situated remotely from the display panel to permit flush mounting of the display panel to the wall, and may be inserted into a wall cavity between wall studs.

In certain embodiments, the flange is integral to a portion of the support electronics housing. In certain embodiments, the flange is detachable from the support electronics housing. In certain embodiments, the mounting bracket assembly comprises a hinged mounting bracket assembly situated adjacent an upper edge of the display panel to permit the display panel to rotate upward and downward about the hinge. In certain embodiments, a hinge pin keeper that prevents the hinge pin from inadvertently disengaging from the mounting bracket assembly. In certain embodiments, the mounting bracket assembly comprises a hinged mounting bracket assembly situated adjacent an upper edge of the display panel to permit the display panel to rotate upward and downward about the hinge. In certain embodiments, a hinge pin keeper that prevents the hinge pin from inadvertently disengaging from the mounting bracket assembly. In certain embodiments, the support electronics housing is less than 14.5 inches wide and less than 4.0 inches deep and less than a height of the display panel. In certain embodiments, the support electronics housing is mechanically detachably connectable to the display panel. In certain embodiments, the flange includes a clamping mechanism'that mechanically clamps the support electronics housing to a segment of drywall.

In another example implementation, a television device has a display panel having a video display situated therein, the display panel being housed in a substantially rectangular housing having a viewing surface and a rear surface separated by an approximately uniform depth. A support electronics housing is separate from the display panel and less than 14.5 inches wide and less than 4.0 inches deep and less than a height of the display panel. A flange is situated at an outer periphery of the support electronics housing to facilitate mounting of the support electronics housing within a hole in a wall so that the support electronics is substantially recessed within a wall cavity, wherein the flange surrounds a periphery of the support electronics housing and is sized so as to hide a cut edge of the wall and overlaps adjacent wall studs to permit attachment of the flange to the wall studs to mechanically support the support electronics housing within the wall cavity. The flange is integral to a portion of the support electronics housing. The support electronics housing carries electronics that support use of the display panel as a television. One or more electrical cables electrically interconnect the support electronics housing with the display panel. An electronic video interface residing in the support electronics housing and has an electrical connector to provide video signals thereto. A power source resides in the support electronics housing that receives household electrical power and supplies electrical power to the display panel through the one or more electrical cables. A mounting bracket assembly is connected to the flange for mounting the display panel to a wall such that the rear surface is approximately flush with the wall. The support electronics can be situated remotely from the display panel to permit flush mounting of the display panel to the wall, and may be inserted into a wall cavity between wall studs, wherein the mounting bracket assembly comprises a hinged mounting bracket assembly situated adjacent an upper edge of the display panel to permit the display panel to rotate upward and downward about the hinge.

While certain illustrative embodiments have been described, it is evident that many alternatives, modifications, permutations and variations will become apparent to those skilled in the art in light of the foregoing description.

What is claimed is:

1. A television device, comprising in combination:
   a display panel having a video display situated therein, the display panel being housed in a rectangular housing having a viewing surface and a rear surface separated by an approximately uniform depth;
   a support electronics housing, separate from the display panel is sized to be no wider than a standard household wall stud spacing and no deeper than a standard household wall cavity depth;
   the support electronics housing carrying electronics including a television receiver that support use of the display panel as a television display and where not all electronics required to use the display panel as a television reside within the support electronics housing;
   one or more electrical cables that electrically interconnects the support electronics housing with the display panel;
   an electronic video interface residing in the support electronics housing and having an electrical connector to provide video signals thereto;
   a power supply residing in the support electronics housing that receives household electrical power converts that household electrical power to a converted form of electrical power and supplies the converted form of the electrical power to the display panel through the one or more electrical cables;
   a mounting bracket assembly for mounting the display panel to a wall such that the rear surface of the display panel is approximately flush with an outer surface of the wall; and
   where the support electronics is situated remotely from the display panel to permit the flush mounting of the display panel to the wall, and is situated within a wall cavity between wall studs and wall panels.

2. The television device according to claim 1, further comprising a flange situated at an outer periphery of the support electronics housing to facilitate mounting of the support electronics housing within a hole in a wall so that the support electronics is substantially recessed within a wall cavity.

3. The television device according to claim 2, wherein the flange surrounds a periphery of the support electronics housing and is sized so as to hide a cut edge of the wall and overlaps adjacent wall studs to permit attachment of the flange to the wall studs to mechanically support the support electronics housing within the wall cavity.

4. The television device according to claim 2, wherein the flange is integral to a portion of the support electronics housing.

5. The television device according to claim 2, wherein the flange is detachable from the support electronics housing.

6. The television device according to claim 2, wherein the flange includes a clamping mechanism that mechanically clamps the support electronics housing to a segment of drywall.

7. The television device according to claim 1, wherein the mounting bracket assembly is connected to the flange.

8. The television device according to claim 7, wherein the mounting bracket assembly comprises a hinged mounting bracket assembly situated adjacent an upper edge of the display panel to permit the display panel to rotate upward and downward about the hinge.

9. The television device according to claim 8, further comprising a hinge pin keeper that prevents the hinge pin from inadvertently disengaging from the mounting bracket assembly.

10. The television device according to claim 1, wherein the mounting bracket assembly comprises a hinged mounting bracket assembly situated adjacent an upper edge of the display panel to permit the display panel to rotate upward and downward about the hinge.

11. The television device according to claim 10, further comprising a hinge pin keeper that prevents the hinge pin from inadvertently disengaging from the mounting bracket assembly.

12. The television device according to claim 10, wherein the support electronics housing is less than 14.5 inches wide and less than 4.0 inches deep and less than a height of the display panel.

13. The television device according to claim 1, wherein the support electronics housing is mechanically detachably connectable to the display panel.

14. The television device according to claim 1, further comprising a connection panel separate from the support electronics housing that comprises a plurality of electrical connectors that facilitate connection of audio video devices thereto.

15. A television device, comprising in combination:
   a display panel having a video display situated therein, the display panel being housed in a rectangular housing having a viewing surface and a rear surface separated by an approximately uniform depth;
   a support electronics housing separate from the display panel is sized to be no wider than a standard household wall stud spacing and no deeper than a standard household wall cavity depth;
   a flange situated at an outer periphery of the support electronics housing to facilitate mounting of the support electronics housing within a hole in a wall so that the support electronics is recessed within a wall cavity, wherein the flange surrounds a periphery of the support electronics housing and is sized so as to hide a cut edge of the wall and overlaps adjacent wall studs to permit attachment of the flange to the wall studs to mechanically support the support electronics housing within the wall cavity;
   the support electronics housing carrying electronics including a television receiver that support use of the display panel as a television display and where not all electronics required to use the display panel as a television reside within the support electronics housing;
   one or more electrical cables that electrically interconnects the support electronics housing with the display panel;
   an electronic video interface residing in the support electronics housing and having an electrical connector to provide video signals thereto;
   a power supply residing in the support electronics housing that receives household electrical power and converts the household electrical power to a converted form of electrical power and supplies the converted form of electrical power to the display panel through the one or more electrical cables;
   a mounting bracket assembly connected to the flange for mounting the display panel to a wall such that the rear surface of the display panel is approximately flush with an outer surface of the wall; and
   where the support electronics is situated remotely from the display panel to permit the flush mounting of the display panel to the wall, and is situated within a wall cavity between wall studs and wall panels.

16. The television device according to claim 15, wherein the flange is integral to a portion of the support electronics housing.

17. The television device according to claim 15, wherein the flange is detachable from the support electronics housing.

18. The television device according to claim 15, wherein the mounting bracket assembly comprises a hinged mounting bracket assembly situated adjacent an upper edge of the display panel to permit the display panel to rotate upward and downward about the hinge.

19. The television device according to claim 18, further comprising a hinge pin keeper that prevents the hinge pin from inadvertently disengaging from the mounting bracket assembly.

20. The television device according to claim 15, wherein the mounting bracket assembly comprises a hinged mounting bracket assembly situated adjacent an upper edge of the display panel to permit the display panel to rotate upward and downward about the hinge.

21. The television device according to claim 20, further comprising a hinge pin keeper that prevents the hinge pin from inadvertently disengaging from the mounting bracket assembly.

22. The television device according to claim 21, wherein the support electronics housing is less than 14.5 inches wide and less than 4.0 inches deep and less than a height of the display panel.

23. The television device according to claim 15, wherein the support electronics housing is mechanically detachably connectable to the display panel.

24. The television device according to claim 15, wherein the flange includes a clamping mechanism that mechanically clamps the support electronics housing to a segment of drywall.

25. A television device, comprising in combination:
   a display panel having a video display situated therein, the display panel being housed in a rectangular housing having a viewing surface and a rear surface separated by an approximately uniform depth;
   a support electronics housing that is separate from the display panel and less than 14.5 inches wide and less than 4.0 inches deep and less than a height of the display panel
   a flange situated at an outer periphery of the support electronics housing to facilitate mounting of the support electronics housing within a hole in a wall so that the support electronics is recessed within a wall cavity, wherein the flange surrounds a periphery of the support electronics housing and is sized so as to hide a cut edge of the wall and overlaps adjacent wall studs to permit attachment of the flange to the wall studs to mechanically support the support electronics housing within the wall cavity;
   wherein the flange is integral to a portion of the support electronics housing;
   the support electronics housing carrying electronics including a television receiver that support use of the display panel as a television display and where not all electronics required to use the display panel as a television reside within the support electronics housing;
   one or more electrical cables that electrically interconnects the support electronics housing with the display panel;
   an electronic video interface residing in the support electronics housing and having an electrical connector to provide video signals thereto;
   a power supply residing in the support electronics housing that receives household electrical power and converts the household electrical power to a converted form of electrical power and supplies the converted form of electrical power to the display panel through the one or more electrical cables;
   a mounting bracket assembly connected to the flange for mounting the display panel to a wall such that the rear surface of the display panel is approximately flush with an outer surface the wall; and
   where the support electronics is situated remotely from the display panel to permit the flush mounting of the display panel to the wall, and is situated within a wall cavity between wall studs and wall panels, and where the mounting bracket assembly comprises a hinged mounting bracket assembly situated adjacent an upper edge of the display panel to permit the display panel to rotate upward and downward about the hinge.

* * * * *